United States Patent [19]

Tomisawa

[11] Patent Number: 5,606,855
[45] Date of Patent: Mar. 4, 1997

[54] APPARATUS AND METHOD FOR ESTIMATING THE TEMPERATURE OF AN AUTOMOTIVE CATALYTIC CONVERTER

[75] Inventor: Naoki Tomisawa, Atsugi, Japan

[73] Assignee: Unisia Jecs Corporation, Atsugi, Japan

[21] Appl. No.: 448,397

[22] PCT Filed: Oct. 28, 1994

[86] PCT No.: PCT/JP94/01827

§ 371 Date: Jun. 7, 1995

§ 102(e) Date: Jun. 7, 1995

[87] PCT Pub. No.: WO95/12752

PCT Pub. Date: Jun. 11, 1995

[30] Foreign Application Priority Data

Nov. 2, 1993 [JP] Japan ................................ 5-274233

[51] Int. Cl.$^6$ ............................................................ F01N 3/20
[52] U.S. Cl. ............................ 60/274; 60/276; 60/277; 60/285
[58] Field of Search ............................ 60/276, 274, 277, 60/285

[56] References Cited

U.S. PATENT DOCUMENTS

| | | | |
|---|---|---|---|
| 4,656,829 | 4/1987 | Creps et al. | 60/276 |
| 5,158,063 | 10/1992 | Hosoda et al. | 60/277 |
| 5,303,168 | 4/1994 | Cullen et al. | 364/557 |

FOREIGN PATENT DOCUMENTS

| | | |
|---|---|---|
| 626507 | 11/1994 | European Pat. Off. . |
| 2-305309 | 12/1990 | Japan . |
| 2-291452 | 12/1990 | Japan . |
| 4-72438 | 3/1992 | Japan . |
| 4-171231 | 6/1992 | Japan . |
| 5-248227 | 9/1993 | Japan . |

*Primary Examiner*—Douglas Hart
*Attorney, Agent, or Firm*—Foley & Lardner

[57] ABSTRACT

Apparatus and method for estimating the temperature of a catalytic converter for automotive engine can be estimated simply and accurately. Specifically, the cooling water temperature Tws at start-up is presumed to correspond to the ambient temperature, and a lost heat amount Tm is estimated based on the cooling water temperature Tws at start-up, and on the vehicle speed VSP. Then, a time integral value STm of the lost heat amount Tm is computed. On the other hand, the engine intake air quantity Q is presumed to correspond to an exhaust quantity, and a received heat amount Tp, which the catalytic converter absorbs from the exhaust, is estimated based on the intake air quantity Q. Then, a time integral value STp of the absorbed heat amount Tp is computed. The time integral value STm is then subtracted from the time integral value STp to obtain a heat amount X retained in the catalytic converter. The heat amount X is then compared with a predetermined value to estimate if the catalytic converter has reached an activation temperature.

6 Claims, 3 Drawing Sheets

APPARATUS AND METHOD FOR ESTIMATING THE TEMPERATURE OF AN AUTOMOTIVE CATALYTIC CONVERTER

TECHNICAL FIELD

The present invention relates to an automotive catalytic converter temperature estimation apparatus and method for estimating, from vehicle operating conditions, the temperature of an exhaust gas purification catalytic converter used for purifying the exhaust gas of an engine.

BACKGROUND ART

Heretofore, there have been various proposals for electronically controlled fuel injection units that feedback control the air-fuel ratio of an engine intake mixture, using detection values from two oxygen sensors respectively disposed upstream and downstream of a three-way catalytic converter (exhaust gas purification catalytic converter) provided in an exhaust system for exhaust gas purification (Japanese Unexamined Patent Publication No. 4-72438).

Moreover, there has also been proposed diagnosis apparatus for determining deterioration of the catalytic converter (a drop in oxygen storage capacity of the catalytic converter) in the above mentioned air-fuel ratio feedback system using the two oxygen sensors, based on a comparison of the output frequencies of the upstream and downstream oxygen sensors.

However, when air-fuel ratio control or diagnosis control is carried out in this way, using the output of the oxygen sensor provided downstream of the catalytic converter, there is a proviso that the catalytic converter has attained an activation temperature.

More specifically, under conditions wherein the catalytic converter has not attained the activation temperature (non-active state), since the oxygen storage effect in the catalytic converter will not be sufficiently realized, there is the likelihood of an erroneous diagnosis of catalytic converter deterioration. Moreover, since the output of the downstream oxygen sensor is changed significantly by the influence from the catalytic converter immediately upstream, then if the catalytic converter is in the non-active state, there is the likelihood of air-fuel ratio control accuracy not being maintained.

Heretofore, conditions for estimating that the catalytic converter is sufficiently activated are first judged based on conditions such as, elapsed time from starting, and engine load, after which air-fuel ratio feedback control and catalytic converter deterioration diagnosis are initiated.

However, under actual vehicle travelling conditions, when the ambient temperature is low, and the vehicle is travelling at high speed, then it is possible for the catalytic converter, which has been at the activation temperature, to become cool and thus enter the non-active state. With the conventional method of judging the activated condition however, this condition, cannot be determined, so that air-fuel ratio control, and diagnosis, are carried out under conditions wherein the catalytic converter is not actually activated. As a result, there is the likelihood of deterioration in exhaust properties, and of erroneous diagnosis of catalytic converter deterioration.

As a technique for addressing the above problems, there is a method wherein the catalytic converter temperature is measured directly using a temperature sensor. However, since there are variations in temperature within the catalytic converter, it is difficult to determine the optimum location for the temperature sensor and to accurately detect the activated condition of the catalytic converter from the temperature sensor output. Moreover, the installation of a temperature sensor results in additional costs.

DISCLOSURE OF THE INVENTION

The present invention addresses the above problems, with the object of providing an apparatus and method that can accurately estimate the catalytic converter temperature corresponding to actual vehicle travelling conditions, without incurring additional costs.

Accordingly the automotive catalytic converter temperature estimation apparatus and method according to the present invention involves detecting the engine cooling water temperature at start-up, the vehicle travelling speed, and the engine intake air quantity, and estimating the temperature of the exhaust gas purification catalytic converter based on the detected results.

With such a construction, the cooling water temperature at start-up is presumed to correspond to the ambient temperature. Moreover, the vehicle travelling speed gives an estimate of the surface air speed over the external surface of the catalytic converter, while the engine intake air quantity corresponds to the quantity of exhaust gas introduced to the catalytic converter. The temperature of the catalytic converter can therefore be estimated by consideration of the ambient conditions, the surface air speed, and the exhaust gas quantity.

Here, the amount of heat lost from the exhaust gas purification catalytic converter may be estimated based on the cooling water temperature at start-up, and the vehicle travelling speed, while the amount of heat absorbed by the exhaust gas purification catalytic converter from engine exhaust gas may be estimated based on the engine intake air quantity. The resultant amount of heat of the exhaust gas purification catalytic converter may then be estimated based on these estimated heat amounts.

With such a construction, the temperature of the catalytic converter can be estimated based on an amount of heat lost from the catalytic converter, which amount changes with ambient temperature and surface air speed, and an amount of heat received from the exhaust gas which heating the catalytic converter.

In estimating the temperature of the catalytic converter based on the above mentioned heat amounts, an amount of heat determined by subtracting the amount of heat lost from the catalytic converter based on the cooling water temperature at start up and the vehicle travelling speed, from an integral value of the amount of heat absorbed by the catalytic converter from the exhaust gas, may be computed as a value that correlates with the temperature of the catalytic converter.

With such a construction, out of the total amount of heat absorbed by the catalytic converter from the exhaust gases, the remaining amount of heat not lost to the atmosphere from the external surfaces of the catalytic converter may be presumed to be a correlation value with the temperature of the catalytic converter.

DESCRIPTION OF THE PREFERRED EMBODIMENTS

Figure 1:
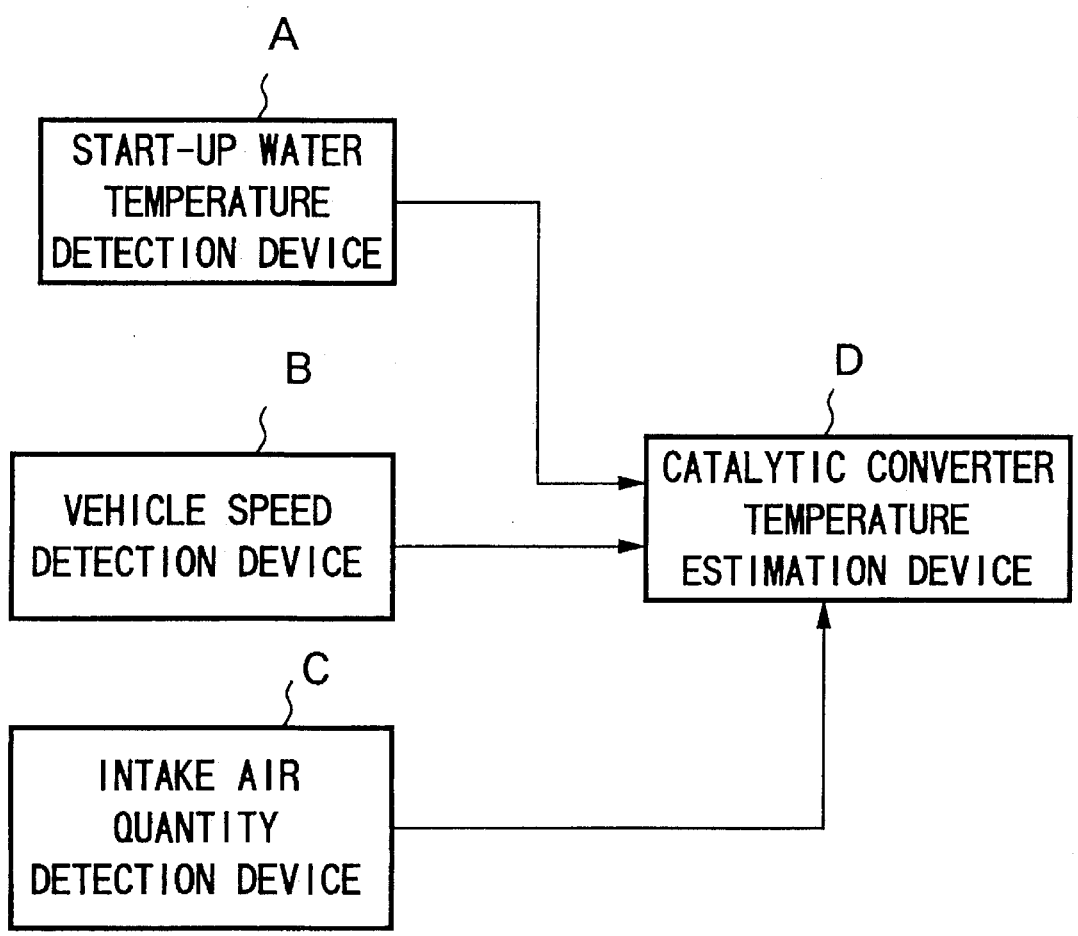
FIG. 1 is a functional block diagram showing a construction of the present invention.

FIG. 1 shows a basic construction of an automotive catalytic converter temperature estimation apparatus according to the present invention.

In FIG. 1, a start-up water temperature detection device A detects the engine cooling water temperature at start-up. A vehicle speed detection device B detects the vehicle travelling speed. An intake air quantity detection device C detects the engine intake air quantity. A catalytic converter temperature estimation device D estimates the temperature of an exhaust gas purification catalytic converter, based on the detected start-up cooling water temperature, the vehicle travelling speed, and the engine intake air quantity.

More specifically, the amount of heat lost from the exhaust gas purification catalytic converter is estimated from the start-up cooling water temperature and the vehicle travelling speed, while the amount of heat absorbed by the exhaust gas purification catalytic converter from the engine exhaust gas is estimated from the engine intake air quantity. The amount of heat retained in the catalytic converter is then obtained from the difference between these heat amounts, to estimate the catalytic converter temperature.

Following is a description of an embodiment of the automotive catalytic converter temperature estimation apparatus and method according to the present invention.

Figure 2:
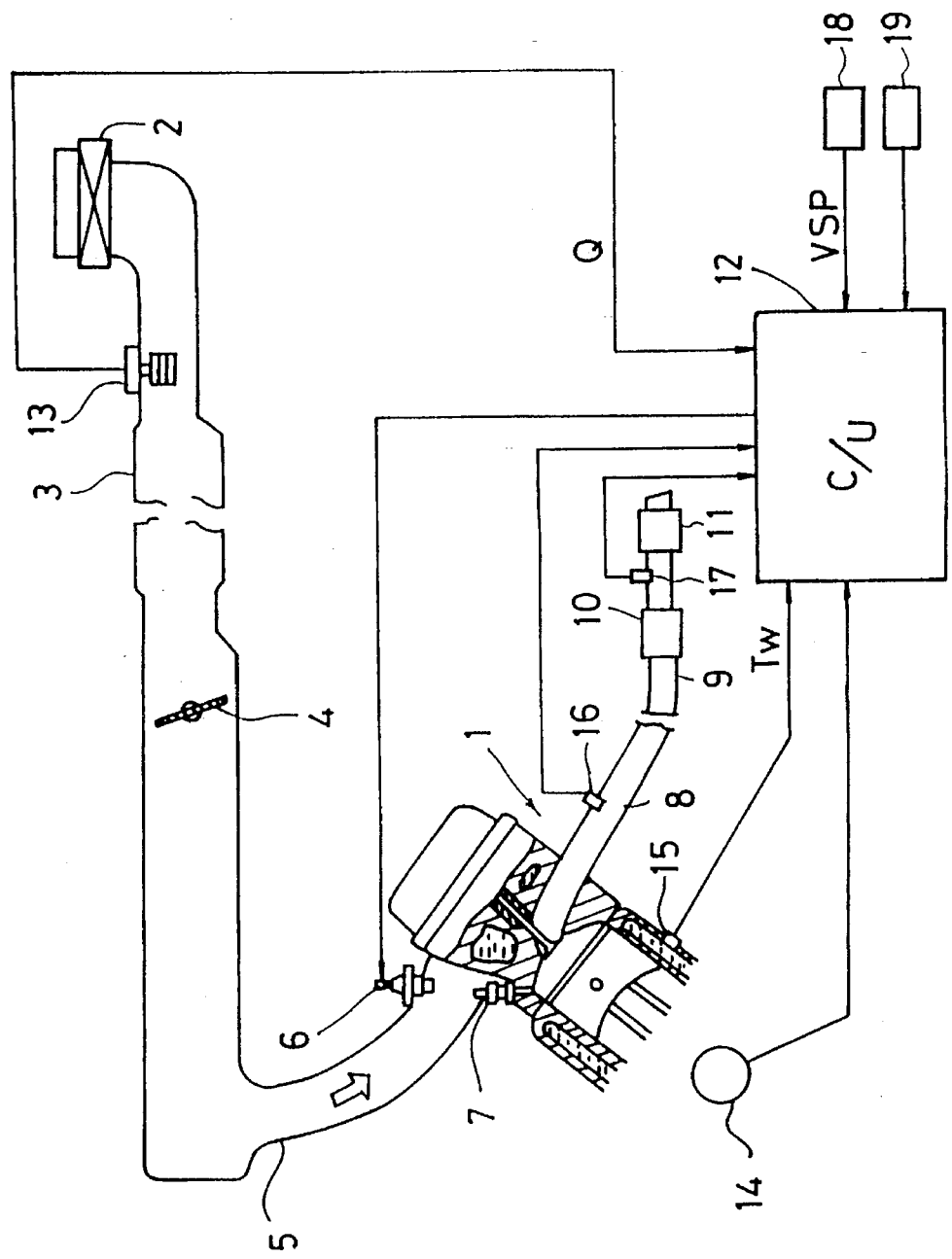
FIG. 2 is a schematic diagram showing an embodiment of the present invention.

FIG. 2 shows a system diagram of a construction of the embodiment. In FIG. 2, an engine 1 mounted on a vehicle (not shown in the figure) draws in air from an air cleaner 2 by way of an intake duct 3, a throttle valve 4, and an intake manifold 5.

Fuel injection valves 6 are provided for each cylinder in respective branch portions of the intake manifold 5. The fuel injection valves 6 are solenoid type fuel injection valves that open with power to a solenoid and close with power shut-off. The injection valves 6 are driven open in response to an injection pulse signal from a control unit 12 (to be described later) so that fuel pressurized by a fuel pump (not shown), and controlled to a predetermined pressure by means of a pressure regulator, is injected to inside the intake manifold 5.

Respective ignition plugs 7 are provided for each combustion chamber of the engine 1 for spark ignition of a mixture therein.

Exhaust from the engine 1 is discharged by way of an exhaust manifold 8, an exhaust duct 9, a three-way catalytic converter 10 for exhaust purification (exhaust gas purifying catalytic converter), and a muffler 11.

The control unit 12 incorporates a microcomputer having a CPU, ROM, RAM, A/D converter and input/output interface. It computes a fuel injection amount Ti based on detection signals input from various sensors, and intermittently drives open the fuel injection valves 6 based on this amount Ti.

For the various sensors there is provided, an airflow meter 13 (intake air quantity detection device) that outputs a voltage signal corresponding to an intake air quantity Q of the engine 1, a crank angle sensor 14 that outputs a rotation signal of the engine 1, and a water temperature sensor 15 for detecting the cooling water temperature Tw in the water jacket of the engine 1.

Also provided is a vehicle speed sensor 18 (vehicle speed detection device) for detecting the travelling speed (vehicle speed) VSP of the vehicle on which the engine 1 is mounted. An ON/OFF signal from a start switch 19 is also input to the control unit 12.

There is also a first oxygen sensor 16 provided at a junction portion of the exhaust manifold 8 on the upstream side of the catalytic converter 10, and a second oxygen sensor 17 provided on the downstream side of the catalytic converter 10 and upstream of the muffler 11.

The first oxygen sensor 16 and the second oxygen sensor 17 are known sensors whose output values change in response to the concentration of oxygen in the exhaust gas. They are rich/lean sensors, that utilize the fact that the concentration of oxygen in the exhaust gas drastically changes around the stoichiometric air-fuel ratio, to detect if the exhaust gas air-fuel ratio is richer or leaner than the stoichiometric air-fuel ratio.

When predetermined feedback control conditions are established, the CPU of the microcomputer in the control unit 12 feedback corrects the fuel injection amount so that the outputs of the first and second oxygen sensors 16, 17 approach values corresponding to the target air-fuel ratio. Moreover, during the feedback control, the inversion period of the upstream first oxygen sensor 16, is compared with the inversion period of the downstream second oxygen sensor 17, to thereby diagnose deterioration of the three-way catalytic converter 10.

Since the output of the downstream second oxygen sensor 17 is influenced significantly by the catalytic converter 10 located immediately upstream, then it is necessary to allow air-fuel ratio control, and deterioration diagnosis, using the downstream second oxygen sensor 17 with a proviso that detection of the activated condition of the catalytic converter 10 is detected.

Figure 3:
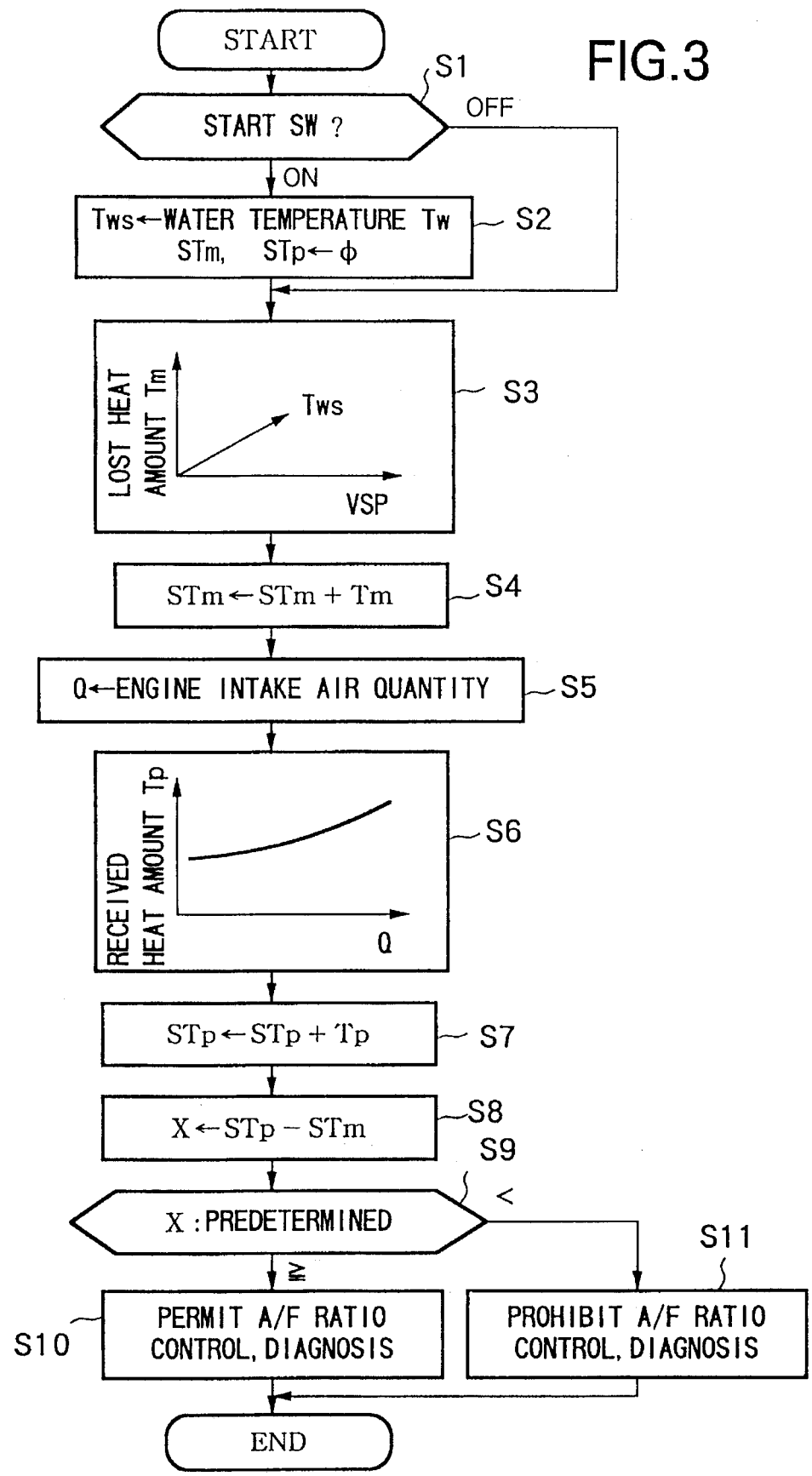
FIG. 3 is a flow chart showing an estimation control routine for catalytic converter temperature used in the embodiment.

Accordingly, with the present embodiment, the control unit 12 is constructed as shown by the flow chart of FIG. 3, to determine whether or not the three-way catalytic converter 10 has attained the activation temperature.

In the present embodiment, the functions of a lost heat estimation device, a received heat estimation device, and a catalytic converter temperature estimation device (including a device where estimation is based on an amount of heat), are realized by software illustrated by the flow chart of FIG. 3 and stored in the control unit 12. Moreover, the functions of a start-up water temperature detection device (to be described later) are realized by software functions stored in the control unit 12, and by a water temperature sensor 15 and start switch 19 as hardware.

In the flow chart of FIG. 3, initially in step 1 (with "step" denoted by S in the figures), it is judged if the start switch 19 is ON or OFF.

When the start switch 19 is ON (cranking condition), control proceeds to step 2, where the cooling water temperate Tw detected by the water temperature sensor 15 is read, and set as the start-up water temperature Tws.

Under normal conditions (after a sufficient time from engine shut-down), the start-up water temperature Tws can be presumed to correspond to the ambient temperature.

Also in step 2, heat amount data STm, STp to be subjected to time integration as described later, is reset to zero.

Once the cooling water temperature Tw has been sampled at start-up, and the heat amount data STm, STp reset to zero, then in the next step 3, the lost heat amount Tm for the three-way catalytic converter 10 is estimated based on the startup water temperature Tws and the vehicle speed VSP detected by the vehicle speed sensor 18.

With the present embodiment, a map in which data of the lost heat amount Tm estimated from a combination of the start-up water temperature Tws and the vehicle speeds VSP has been stored, is provided beforehand, and this map is looked up to obtain an estimated lost heat amount Tm for the current situation.

With the three-way catalytic converter 10, which is generally located beneath the floor of the vehicle, the amount of heat lost from the external surface differs depending on the ambient temperature. Moreover, when the vehicle is travelling, the catalytic converter is affected by the surface air flow so that the lost heat amount changes. Here, since the special provision of a dedicated sensor to measure the ambient temperature would increase costs, the ambient temperature is estimated from the cooling water temperature Tw at the time of start-up. The amount of heat lost from the external surface of the catalytic converter 10 to the atmosphere is then estimated from the start-up water temperature Tws, which corresponds to the ambient temperature, and from the vehicle speed VSP.

Once the lost heat amount Tm has been estimated in step 3, control proceeds to step 4 where the estimated lost heat amount Tm is time integrated to obtain the total lost heat amount STm (total amount of lost heat from start-up).

In step 5, the engine intake air quantity Q detected by the air flow meter 13 is read.

Then in the next step 6, a map of pre-stored estimated received heat amounts Tp for the three-way catalytic converter 10 corresponding to intake air quantity Q, is looked-up, and an estimated received heat amount Tp that the three-way catalytic converter 10 has absorbed from the exhaust gas is obtained for the current conditions.

Since it can be presumed that the received heat amount Tp for the three-way catalytic converter 10 will be large when the exhaust quantity is large, then it is necessary to detect the exhaust quantity. However, since an air flow meter for detecting the intake air quantity Q is generally provided in engines fitted with electronically controlled fuel injection units, then instead of measuring the exhaust quantity, measurement results for the intake air quantity Q, which correspond to the exhaust quantity are used, and the received heat amount Tp from the exhaust gas is estimated based on the intake air quantity Q, so that estimation of the received heat amount Tp can be simply carried out.

In step 7, the received heat amount Tp obtained in step 6 is time integrated to obtain a total received heat amount STp (the total amount of received heat from start-up).

Then in the next step 8, the total lost heat amount STm is subtracted from the total received heat amount STp to compute a predicted heat amount X retained by the catalytic converter 10.

In step 9, the heat amount X is compared with a predetermined value to estimate if the three-way catalytic converter 10 has attained a predetermined activation temperature.

Here, when the heat amount X is above the predetermined value so that it is estimated that the temperature of the catalytic converter 10 has attained the activation temperature, control proceeds to step 10 to permit air-fuel ratio feedback control using the outputs of the first oxygen sensor 16 and the second oxygen sensor 17, and also to permit deterioration diagnosis of the catalytic converter 10 based on the control frequency occurring during air-fuel ratio feedback control.

In this way, estimation of the activation condition of the catalytic converter 10 is made a proviso for allowing air-fuel ratio feedback control and catalytic converter deterioration diagnosis, thereby avoiding a loss in accuracy of the air-fuel ratio control and the deterioration diagnosis.

On the other hand, when the heat amount X is less than the predetermined value so that it is estimated that the temperature of the catalytic converter 10 has not attained the activation temperature, control proceeds to step 11 to prohibit air-fuel ratio feedback control using the outputs of the first oxygen sensor 16 and the second oxygen sensor 17, and to prohibit deterioration diagnosis of the catalytic converter 10 based on the control frequency occurring during air-fuel ratio feedback control.

More specifically, when the catalytic converter 10 has not attained the activation temperature, then the downstream second oxygen sensor 17, which is influenced by the catalytic converter 10, cannot maintain its expected detection accuracy, so that air-fuel ratio control accuracy deteriorates. Moreover, it becomes impossible to distinguish between air-fuel ratio control characteristics due to deterioration of the catalytic converter 10 and air-fuel ratio control characteristics due to the non-active state of the catalytic converter 10 so that there is the possibility of erroneous diagnosis of deterioration of the catalytic converter 10. Therefore, air-fuel ratio control, and diagnosis, are prohibited to avoid erroneous control and erroneous diagnosis.

With the present embodiment, the catalytic converter activity is estimated based on an estimation of the heat amount lost from the catalytic converter 10 to the atmosphere, and an estimation of the received heat amount absorbed by the catalytic converter 10 from the exhaust. Therefore, even with temperature fluctuations inside the catalytic converter 10, a representative temperature condition can be accurately determined without influence from these fluctuations. Moreover, since the estimation of the lost heat amount and the received heat amount is carried out based on the cooling water temperature Tw, the vehicle speed VSP, and the intake air quantity Q, which are conventionally required for fuel injection quantity control and for automatic transmission control, then there is no requirement for the new addition of sensors for estimating heat amount so that costs are not increased.

The present embodiment has been described for an engine wherein an oxygen sensor 17 is also provided downstream of the catalytic converter 10, and air-fuel ratio feedback control is carried out using two oxygen sensors 16 and 17. However, it will be apparent that estimation of the catalytic converter temperature based on lost heat amount and received heat amount is not limited to such an engine.

Moreover, with the present embodiment, since the start-up water temperature Tws is presumed to correspond to the ambient temperature, then with restarting before the cooling water has cooled sufficiently, there will be an error in the detection of the ambient temperature, resulting in an error difference in the estimation result for the lost heat amount. Therefore, when the start-up cooling water temperature Tws is above a predetermined temperature, processing can be switched to one wherein the catalytic converter activation condition is determined based on an elapsed time from start-up or on the engine load. Hence when an elapsed time from start-up has not reached a predetermined time, the catalytic converter can be presumed to be in the non-active state, even if the catalytic converter activation condition can be estimated based on the heat amount X.

INDUSTRIAL APPLICABILITY

With the present invention as described above, since the heat amount conditions for the catalytic converter are estimated based on cooling water temperature at start-up, vehicle speed, and engine intake air quantity, the catalytic converter temperature can be estimated without influence from temperature fluctuations inside the catalytic converter, and moreover without an increase in costs. The invention therefore has significant industrial applicability.

I claim:

1. A catalytic converter temperature estimation apparatus for estimating the temperature of a catalytic converter provided in an exhaust passage of an engine, comprising:

an engine coolant temperature sensor adapted for detecting the temperature of an engine coolant;

a vehicle speed sensor adapted for detecting a traveling speed of a vehicle;

an air flow meter adapted for detecting an intake air quantity of the engine;

a start switch adapted for detecting an engine start-up condition; and catalytic converter temperature estimation means adapted for estimating the temperature of the catalytic converter based on the engine coolant temperature at start-up, the vehicle traveling speed, and the engine intake air quantity, wherein the catalytic converter temperature estimation means reads the engine coolant temperature detected by the sensor and reads the engine coolant temperature as an ambient temperature when the engine start-up condition is detected by the start switch.

2. An automotive catalytic converter temperature estimation apparatus according to claim 1, wherein the catalytic converter temperature estimation means estimates an amount of heat lost from the exhaust gas purification catalytic converter, based on the engine coolant temperature at start-up, the vehicle traveling speed, and an amount of heat absorbed by the exhaust gas, based on the engine intake air quantity, wherein the catalytic converter temperature is estimated based on the amount of heat lost and the amount of heat absorbed.

3. An automotive catalytic converter temperature estimation apparatus according to claim 2, wherein the catalytic converter temperature estimation means estimates the temperature of the catalytic converter based on an amount of heat absorbed determined by subtracting an integral value of the amount of heat lost from an integral value of the amount of heat absorbed.

4. A method of estimating the temperature of an exhaust gas purification catalytic converter in an engine exhaust passage of a vehicle comprising the steps of:

detecting the temperature of an engine coolant;

detecting an engine start-up condition;

detecting the speed of the vehicle;

detecting an intake air quantity of an engine;

reading the engine coolant temperature as an ambient temperature when the engine start-up condition is detected; and estimating the temperature of the exhaust gas purification catalytic converter based on the detected coolant temperature at start-up, the vehicle traveling speed, and the engine intake air quantity.

5. A method according to claim 4, wherein the exhaust gas purification catalytic converter estimating step further comprises the steps of:

estimating an amount of heat lost from the exhaust gas purification catalytic converter based on the engine coolant temperature at start-up, and vehicle traveling speed, and an amount of heat absorbed by the exhaust gas purification catalytic converter from the exhaust gas, based on the engine intake air quantity; and estimating the temperature of the exhaust gas purification catalytic converter based on the amount of heat lost and the amount of heat absorbed.

6. A method according to claim 5, wherein estimating the temperature of the exhaust gas purification catalytic converter further comprises determining the amount of heat absorbed by subtracting an integral value of the amount of heat lost from an integral value of the amount of heat absorbed.

* * * * *